J. M. TOWNE & P. E. GIBSON.
SHIP HULL CLEANER.
APPLICATION FILED FEB. 4, 1910.
974,000.
Patented Oct. 25, 1910.
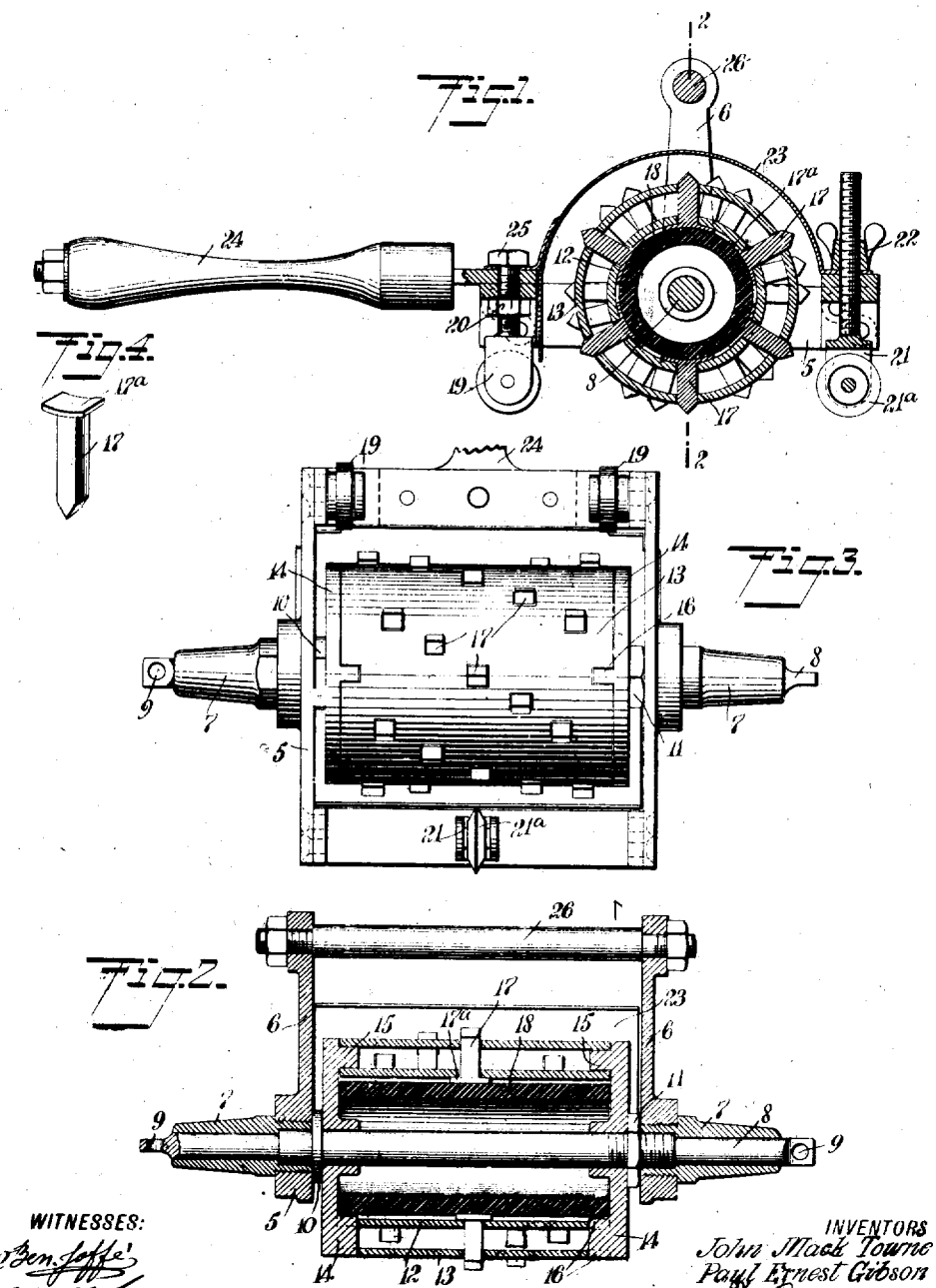
INVENTORS
John Mack Towne
Paul Ernest Gibson
BY
ATTORNEYS
WITNESSES:

UNITED STATES PATENT OFFICE.

JOHN MACK TOWNE AND PAUL ERNEST GIBSON, OF TAMPA, FLORIDA.

SHIP-HULL CLEANER.

974,000.

Specification of Letters Patent.

Patented Oct. 25, 1910.

Application filed February 4, 1910. Serial No. 542,001.

*To all whom it may concern:*

Be it known that we, JOHN MACK TOWNE and PAUL ERNEST GIBSON, both citizens of the United States, and residents of Tampa, in the county of Hillsboro and State of Florida, have invented a new and Improved Ship-Hull Cleaner, of which the following is a full, clear, and exact description.

The invention is an improvement in devices for cleaning the hulls of ships of scale, barnacles, paint, iron rust and other crusts, and has in view a machine of this character designed to be manually moved over the surface to be cleaned, and embodying a rotary cylinder having a series of chisels or cutters, the cutters being yieldingly pressed to cutting position, and the depth of the cut regulated by the adjustment of the guide-wheels on which the machine is supported or travels.

Reference is to be had to the accompanying drawings forming a part of this specification, in which similar characters of reference indicate corresponding parts in all the views.

Figure 1 is a side view of a hull cleaning machine constructed in accordance with our invention, showing the cleaning cylinder and adjacent parts in cross-section; Fig. 2 is a section of the machine on the line 2—2 of Fig. 1; Fig. 3 is an inverted plan of the machine, with the handle for moving the machine over the surface to be cleaned, broken away; and Fig. 4 is a perspective view of one of the chisels.

In the construction of the machine we provide a frame 5, of approximately rectangular form, having at or near the center upwardly-extending arms 6. At the junction of these arms alining bearings 7, are threaded into or otherwise attached to the side bars of the frame and extend outwardly therefrom a substantial distance. Within the bearings 7 is journaled a shaft 8, which is of sufficient length to extend beyond the said bearings, where it is provided at each end with an eye 9 for coupling it to a suitable motor. At the inside of the frame the shaft 8 is provided with a stop collar 10 at one side, and at the corresponding opposite side is threaded to receive a nut 11. Between this collar and the nut is secured a rotary cutting cylinder comprising an inner and an outer shell 12 and 13 respectively, and heads 14, the heads having inwardly-projecting flanges 15, on the inner and outer sides of which the shells 12 and 13 respectively bear, the outer surface of the outer shell 13 being flush with the peripheries of the heads, and the heads having at suitable points inwardly-extending tongues 16, received in corresponding slots in the shells and preventing relative rotation between them. By this construction the composite cylinder is substantially rigid on the shaft when the nut 11 is tightened.

In the shells of the cylinder are provided a series of alining radiating openings, in which are slidable crustacean cutters or chisels 17, the chisels, as shown, having cutting points much in the nature of an ordinary cold chisel, with the cutting edges extending longitudinally of the cylinder and the chisels arranged in oblique or spiral rows, with the chisels of one row staggered or arranged in the intervals of the chisels of adjacent rows, so that the surface on which the cutter is acting will be thoroughly cleaned in the travel of the machine. Each chisel 17 has a head $17^a$, which is arranged at the inside of the inner cylinder 12 and bears on a heavy rubber tube 18, the tube serving to yieldingly press the chisels or cutters to the limit of their outward movement. The heads $17^a$ of the chisels conform to the curvature of the cylinder and afford the chisels a substantial bearing surface on the rubber tube or cushion.

At each side of and adjacent to the rear of the frame is a caster or roller 19, each having a threaded shank provided with adjusting nuts 20, adapted to bind the frame at opposite sides and permit of the adjustment of the rollers. A third roller or caster 21, arranged centrally at the front of the machine is threaded through the frame and provided with a lock-nut 22, the lock-nut in the form of the invention shown serving to secure one end of a casing 23, curved over and covering the top of the cutting cylinder. The roller of the caster 21 is constructed with a beveled cutting edge $21^a$, to cut into the crusts on the surface being cleaned and keep the cutters of the cylinder at a uniform distance from this surface. A handle 24 extends from the rear side of the frame, to which it is suitably secured by bolts or other devices 25, one of which secures this side of the casing 23 in place, the casing being extended downwardly sufficiently far at the front of the rollers 19 to prevent the cuttings from being thrown against the operator's hand grasping the handle 24. The upwardly-extended arms 6 of the frame at the top are connected together by a cross-bar 26, which serves as a handle for pressing the machine to the surface being cleaned.

In the operation of the machine, the operator grasps the handle 26 with his right hand and the handle 24 with the left, and the cutter is set in motion by connecting it with a suitable motor. The machine is then moved over the surface by the aid of the handle 24, while it is firmly pressed to place by the handle 26, the cutters operating to clean off the crustaceans in the travel of the machine, the blow of each cutter being cushioned as it strikes the crusts, by the elastic tube 18. The depth of the cut is regulated by the adjustment of the casters or rollers 19 and 21.

Having thus described our invention, we claim as new and desire to secure by Letters Patent:

1. In a machine for cleaning a surface of scale, barnacle and other crusts, a frame, a crustacean cutter carried by the frame, and a wheel supporting the frame in advance of the cutter, having a cutting edge to cut into the crusts.

2. In a machine for cleaning a surface of scale, barnacles and other crusts, a wheel-supported frame adapted to be moved over the surface to be cleaned, a cylinder journaled on the frame, having a series of cutters slidable therein, and an elastic tube on which the cutters seat, arranged within the cylinder.

3. In a machine for cleaning a surface of scale, barnacles and other crusts, a frame, a rotary crustacean cutter carried by the frame, and wheels supporting the frame, adapting the cutter to be moved over the said surface, with one of said wheels arranged at the front of the cutter and constructed with a cutting edge to cut into the crusts and maintain the cutter at substantially a uniform distance from the said surface.

4. In a machine for cleaning a surface of scale, barnacle and other crusts, a rectangular frame, a rotary crustacean cutter journaled within the frame, wheels supporting the frame at both the front and rear of the cutter, a handle extending from the frame rearwardly, arms extending upwardly from each side of the frame at the axis of the cutter, a handle connected to the arms, and a casing connected to the frame and curved about the upper portion of the cutter underneath the last-named handle.

5. In a machine for cleaning a surface of scale, barnacles and other crusts, a cylinder having a series of cutters having longitudinally-extending cutting edges and arranged in oblique or spiral rows, with the cutters of one row arranged in the intervals of the cutters of an adjacent row.

6. In a machine for cleaning a surface of scale, barnacles and other crusts, a cylinder having inner and outer shells provided with alining radiating openings, and chisels guided in the several sets of openings in the shells and having a limited sliding movement therein.

7. In a machine for cleaning a surface of scale, barnacles and other crusts, cylinder heads having inwardly-projecting flanges, inner and outer shells respectively bearing on the inner and outer faces of the flanges and having interfitting portions, with the heads securing them against relative rotation, a shaft on which the heads are arranged, having means for binding them together, an elastic tube arranged within the inner shell, and a series of chisels loosely extending through the shells and having heads seating on the tube.

In testimony whereof we have signed our names to this specification in the presence of two subscribing witnesses.

JOHN MACK TOWNE.
  PAUL ERNEST GIBSON.

Witnesses as to signature of John Mack Towne:
  E. F. WILSON,
  CLARA I. BROWNING.

Witnesses as to signature of Paul Ernest Gibson:
  W. H. M. BORHUNG,
  JOHN C. WHITE.